(12) United States Patent
Dixon et al.

(10) Patent No.: US 8,847,529 B2
(45) Date of Patent: Sep. 30, 2014

(54) ELECTRIC MOTOR CONTROL

(75) Inventors: Christopher David Dixon, Coventry (GB); Christopher Digby Roberts, Kinver (GB)

(73) Assignee: TRW Limited, West Midlands (GB)

( * ) Notice: Subject to any disclaimer, the term of this patent is extended or adjusted under 35 U.S.C. 154(b) by 433 days.

(21) Appl. No.: 12/668,078

(22) PCT Filed: Jun. 30, 2008

(86) PCT No.: PCT/GB2008/002257
§ 371 (c)(1),
(2), (4) Date: Mar. 18, 2010

(87) PCT Pub. No.: WO2009/007681
PCT Pub. Date: Jan. 15, 2009

(65) Prior Publication Data
US 2010/0194325 A1 Aug. 5, 2010

(30) Foreign Application Priority Data
Jul. 7, 2007 (GB) .................................. 0713239.2

(51) Int. Cl.
*H02H 7/08* (2006.01)
(52) U.S. Cl.
USPC ............ 318/400.21; 318/400.02; 318/400.04; 318/434
(58) Field of Classification Search
USPC ............ 318/400.06, 400.13, 400.21, 400.33, 318/430–432, 438, 439, 280, 494, 254, 434, 318/400.02, 400.34, 567, 696, 727, 400.04; 702/145
See application file for complete search history.

(56) References Cited

U.S. PATENT DOCUMENTS

| | | | | |
|---|---|---|---|---|
| 4,725,765 A | * | 2/1988 | Miller | 318/434 |
| 5,008,608 A | * | 4/1991 | Unsworth et al. | 318/729 |
| 5,076,761 A | * | 12/1991 | Krohn et al. | 417/18 |
| 5,151,642 A | * | 9/1992 | Lombardi et al. | 318/779 |
| 5,367,236 A | * | 11/1994 | Salazar | 318/567 |
| 5,600,218 A | * | 2/1997 | Holling et al. | 318/400.04 |
| 5,637,976 A | * | 6/1997 | Chen et al. | 318/809 |
| 5,672,945 A | * | 9/1997 | Krause | 318/434 |
| 5,744,921 A | * | 4/1998 | Makaran | 318/400.34 |
| 5,821,713 A | * | 10/1998 | Holling et al. | 318/400.32 |

(Continued)

FOREIGN PATENT DOCUMENTS

| | | |
|---|---|---|
| CN | 1674431 A | 9/2005 |
| DE | 4419813 A1 | 12/1995 |

(Continued)

OTHER PUBLICATIONS

Chinese Search Report, Application No. CN200880105404.X dated Nov. 23, 2012.

(Continued)

*Primary Examiner* — Paul Ip
(74) *Attorney, Agent, or Firm* — MacMillan, Sobanski & Todd, LLC

(57) ABSTRACT

A control system for an electric motor comprises processing means arranged to perform a control process which includes monitoring electrical voltages applied to the motor and electrical currents in the motor, and determining from them the rotational position of the motor. The system is further arranged to monitor at least one parameter of the control process thereby to detect a stall condition of the motor.

20 Claims, 7 Drawing Sheets

(56) References Cited

U.S. PATENT DOCUMENTS

| | | | |
|---|---|---|---|
| 5,917,296 A * | 6/1999 | Frey et al. | 318/268 |
| 6,469,462 B2 * | 10/2002 | Shimane et al. | 318/280 |
| 6,548,975 B2 * | 4/2003 | Kleinau et al. | 318/434 |
| 6,838,847 B2 * | 1/2005 | Dragoi et al. | 318/434 |
| 6,900,607 B2 * | 5/2005 | Kleinau et al. | 318/432 |
| 6,943,676 B2 * | 9/2005 | Mack | 340/453 |
| 7,071,649 B2 * | 7/2006 | Shafer et al. | 318/783 |
| 7,116,070 B2 * | 10/2006 | MacKay | 318/400.11 |
| 7,163,080 B2 * | 1/2007 | Fardoun et al. | 180/446 |
| 7,196,491 B2 * | 3/2007 | Mayhew et al. | 318/778 |
| 7,199,549 B2 * | 4/2007 | Kleinau et al. | 318/798 |
| 7,224,177 B2 | 5/2007 | Kim et al. | |
| 7,383,902 B2 * | 6/2008 | Matsuzaki et al. | 180/65.285 |
| 7,397,212 B2 * | 7/2008 | Turner | 318/561 |
| 7,423,394 B2 * | 9/2008 | Collins | 318/400.01 |
| 7,443,116 B2 * | 10/2008 | Kutsuna et al. | 318/139 |
| 7,511,474 B2 * | 3/2009 | Washington | 324/166 |
| 7,521,884 B2 * | 4/2009 | Filippenko | 318/400.06 |
| 7,535,684 B2 * | 5/2009 | Ganev et al. | 361/23 |
| 7,633,251 B2 * | 12/2009 | Collins | 318/400.14 |
| 7,633,252 B2 * | 12/2009 | Maue et al. | 318/434 |
| 7,642,676 B2 * | 1/2010 | Washington | 307/130 |
| 7,668,690 B2 * | 2/2010 | Schneider et al. | 702/145 |
| 7,911,167 B2 * | 3/2011 | Takeuchi | 318/432 |
| 8,080,964 B2 * | 12/2011 | Hudson et al. | 318/568.11 |
| 8,390,235 B2 * | 3/2013 | Bagarelli et al. | 318/696 |
| 2001/0015631 A1 * | 8/2001 | Shimane et al. | 318/280 |
| 2003/0001533 A1 * | 1/2003 | Kleinau et al. | 318/434 |
| 2003/0034793 A1 * | 2/2003 | Lee et al. | 324/772 |
| 2003/0071594 A1 * | 4/2003 | Kleinau et al. | 318/567 |
| 2003/0076061 A1 * | 4/2003 | Kleinau et al. | 318/434 |
| 2003/0076064 A1 * | 4/2003 | Kleinau et al. | 318/567 |
| 2003/0076065 A1 * | 4/2003 | Shafer et al. | 318/567 |
| 2003/0127289 A1 * | 7/2003 | Elgas et al. | 187/224 |
| 2003/0130772 A1 * | 7/2003 | Yanagida et al. | 701/22 |
| 2003/0210011 A1 * | 11/2003 | Dragoi et al. | 318/727 |
| 2004/0056629 A1 * | 3/2004 | Maeda et al. | 318/719 |
| 2004/0057171 A1 * | 3/2004 | Mayhew et al. | 361/23 |
| 2004/0061603 A1 * | 4/2004 | Mack | 340/453 |
| 2004/0155622 A1 * | 8/2004 | Mayhew et al. | 318/778 |
| 2004/0163860 A1 * | 8/2004 | Matsuzaki et al. | 180/65.2 |
| 2004/0211200 A1 * | 10/2004 | McMillan et al. | 62/186 |
| 2005/0007044 A1 * | 1/2005 | Qiu et al. | 318/254 |
| 2005/0156556 A1 * | 7/2005 | Hermann et al. | 318/778 |
| 2005/0212548 A1 | 9/2005 | Kim et al. | |
| 2005/0258581 A1 * | 11/2005 | Tanaka | 267/140.11 |
| 2006/0038517 A1 * | 2/2006 | MacKay | 318/254 |
| 2006/0201736 A1 * | 9/2006 | Fardoun et al. | 180/446 |
| 2006/0232896 A1 * | 10/2006 | Maue et al. | 361/23 |
| 2006/0273747 A1 * | 12/2006 | Takeuchi | 318/432 |
| 2007/0114965 A1 * | 5/2007 | Kutsuna et al. | 318/807 |
| 2007/0132446 A1 * | 6/2007 | Kleinau et al. | 324/160 |
| 2007/0159123 A1 * | 7/2007 | Collins | 318/439 |
| 2008/0100146 A1 * | 5/2008 | Washington | 307/130 |
| 2008/0100245 A1 * | 5/2008 | Turner | 318/437 |
| 2008/0100248 A1 * | 5/2008 | Filippenko | 318/466 |
| 2008/0116898 A1 * | 5/2008 | Washington | 324/521 |
| 2008/0165456 A1 * | 7/2008 | Ganev et al. | 361/23 |
| 2008/0290828 A1 * | 11/2008 | Haas et al. | 318/434 |
| 2008/0297083 A1 * | 12/2008 | Collins | 318/400.13 |
| 2008/0315811 A1 * | 12/2008 | Hudson et al. | 318/400.34 |
| 2009/0071594 A1 * | 3/2009 | Johnson et al. | 156/181 |
| 2009/0254300 A1 * | 10/2009 | Schneider et al. | 702/145 |
| 2010/0289445 A1 * | 11/2010 | Bagarelli et al. | 318/696 |
| 2011/0089876 A1 * | 4/2011 | Patel et al. | 318/400.33 |
| 2011/0093167 A1 * | 4/2011 | Williams et al. | 701/41 |
| 2011/0181229 A1 * | 7/2011 | Galic et al. | 318/696 |
| 2011/0184560 A1 * | 7/2011 | Brickell et al. | 700/275 |
| 2012/0056570 A1 * | 3/2012 | Hudson et al. | 318/494 |
| 2012/0217908 A1 * | 8/2012 | Wu et al. | 318/400.02 |

FOREIGN PATENT DOCUMENTS

| | | |
|---|---|---|
| EP | 1271762 A2 | 1/2003 |
| EP | 1670134 A1 | 6/2006 |
| GB | 2238920 A | 6/1991 |
| JP | 10304694 A | 11/1998 |
| WO | 2007072033 A2 | 6/2007 |

OTHER PUBLICATIONS

Patent Act 1977: Search Report under Section 17, Application No. GB0713239.2 dated Sep. 19, 2007.

* cited by examiner

Fig. 6a
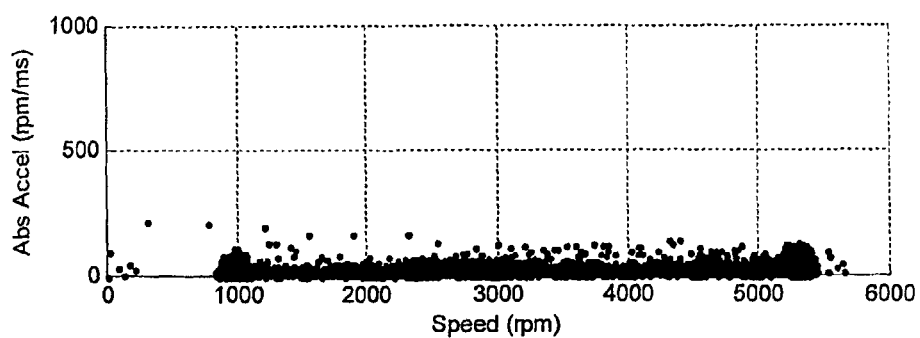
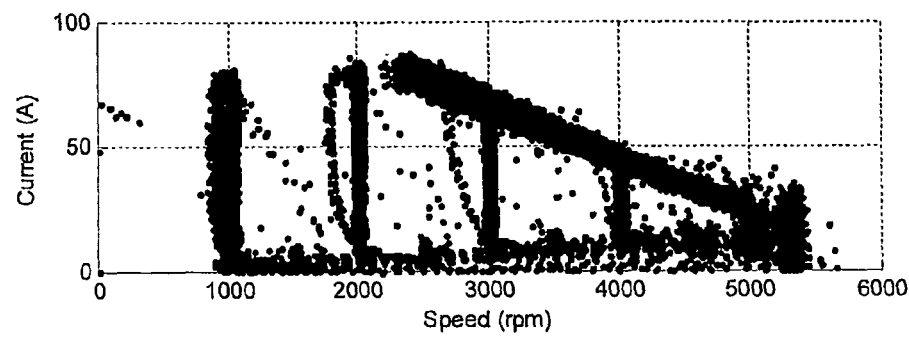
Fig. 6b

ELECTRIC MOTOR CONTROL

CROSS-REFERENCE TO RELATED APPLICATIONS

This application is a national stage of International Application No. PCT/GB2008/002257 filed Jun. 30, 2008, the disclosures of which are incorporated herein by reference, and which claimed priority to Great Britain Patent Application No. 0713239.2 filed Jul. 7, 2007, the disclosures of which are incorporated herein by reference.

BACKGROUND OF THE INVENTION

The present invention relates to the control of electric motors, and in particular to the detection of stalling in electric motors. It has particular application in permanent magnet AC motors but can also be used in other types of motor.

In order to control an electric motor, for example using closed loop velocity control or closed loop current control, it is necessary to know the rotational position of the motor. It is well known to use a dedicated position sensor to monitor the rotational position of an electric motor. An overview of a closed loop velocity control system utilising a position sensor is shown in FIG. 1. The rotational position of the three phase motor 10 is monitored by a position sensor 12, the output of which is used to determine the motor speed W by a speed calculation algorithm 14. The system receives a motor speed request W* which is compared with the measured speed W by a comparator 16. The difference between the measured and desired speed, or the speed error, is input to a velocity controller 18 which calculates target currents i*, which are calculated in terms of D and Q current vectors, which are required to bring the motor speed towards the desired speed. These are input to a current comparator 20, which also receives measured D and Q current values generated by a current converter 22 from sensed currents in the three phases of the motor as measured by a current sensor 24. The current comparator 20 outputs the current error, i.e. the difference between the measured currents and the desired currents, and inputs that to a current controller 26. The current controller 26 outputs demanded D and Q voltage values, which are input to a converter 28. The converter 28 converts the D and Q voltage demands into phase voltage demands, i.e. the required voltage in each of the phases of the motor. The phase voltage demands are input to a PWM driver 30 which applies PWM voltages to the motor phases to produce the demanded currents.

For a number of applications a diagnostic may be required that can detect if the motor is stalled, i.e. not rotating, or not rotating at sufficient speed, in response to the current passed through it. This may be because the load on the motor is too high, or because it has become completely locked due to some physical obstruction. The position sensor can be checked directly to determine whether the motor is rotating, for example if the position sensor includes hall sensors, they will not change state if the motor is stalled.

With a sensorless position determining system the position sensor is removed and the position determined by a sensorless position algorithm from knowledge of the voltage applied to the motor and the current measured in the motor. As there is no position sensor there is no method to determine directly if the motor is rotating. Therefore in order to monitor for stalling an alternative method of detection is required.

As mentioned above, the basic requirement of stall detection is that the diagnostic can reliably detect that the motor has locked or otherwise stalled. One example of a stalled motor condition is where the load applied to the motor is greater than the torque that the motor can generate, causing the motor speed to fall to around zero. It may move very slowly or sporadically. If the load is removed the motor will operate as normal. Another example of a stalled motor condition is where the rotor has been mechanically locked, e.g. due to debris in the mechanics. The motor will not rotate at all and is unlikely to unless the cause of the locked rotor can be removed.

Known sensorless position algorithms rely on the back EMF generated in the motor to allow the rotational position to be determined. At zero and low speeds there is no or little back EMF generated. The position generated at low speeds is therefore generally incorrect or very noisy as the algorithm attempts to operate without a sufficient level of back EMF. The estimated velocity derived from the position signal is therefore also extremely noisy and overly high in magnitude. The noise levels present on the estimated velocity signal are too high to allow a threshold to be used reliably, even with heavy filtering of the signal. Therefore these known algorithms are not suitable themselves for detecting stall conditions.

BRIEF SUMMARY OF THE INVENTION

The present invention provides a control system for an electric motor, the system comprising processing means arranged to perform a control process which includes monitoring electrical voltages applied to the motor and electrical currents in the motor, and determining from them the rotational position of the motor, wherein the system is further arranged to monitor at least one parameter of the control process thereby to detect a stall condition of the motor.

The at least one parameter may be one used within a position determining process, for example an algorithm, which determines the motor position. For example the at least one parameter may include an estimated velocity, speed, or acceleration of the motor, or the voltages applied to, or currents measured in, the motor. Alternatively, or additionally, the at least one parameter may include a parameter used on the broader control of the motor, such as a demanded current. Where a plurality of parameters are monitored, a stall condition may be detected when only one of them is within a predetermined range, or it may be detected only when all of them are within respective ranges.

The control system may be arranged to monitor repeatedly for detection of a stall condition or fault, and to determine that a stall has occurred only if a stall condition or fault occurs a predetermined number of times within a predetermined period of time.

The control system may be arranged to perform a stall response action in response to detection of a stall condition. For example the stall response action may include providing a warning, and/or generating a predetermined control input.

A benefit of the locked rotor diagnostic of some embodiments of the present invention is that no additional hardware is required to fulfil the safety requirement of detecting a locked or otherwise stalled motor. Without additional hardware a cost saving will be made and potentially the reliability of the system increased.

Other advantages of this invention will become apparent to those skilled in the art from the following detailed description of the preferred embodiments, when read in light of the accompanying drawings.

BRIEF DESCRIPTION OF THE DRAWINGS

FIGS. 6a and 6b show the samples of FIG. 5 on a compressed scale and with associated values of measured current;

DETAILED DESCRIPTION OF THE INVENTION

Figure 1:
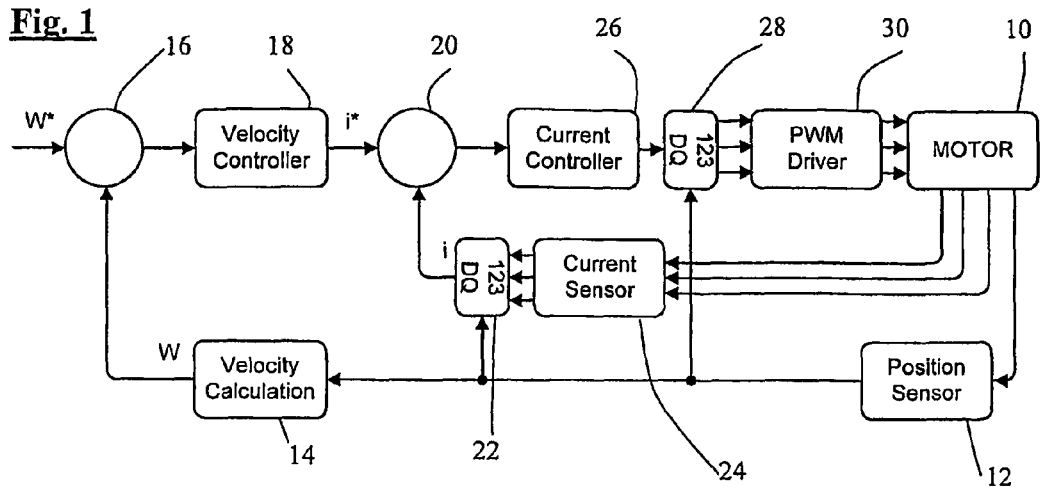
FIG. 1 is a diagram of a closed loop velocity motor control system that includes a position sensor.
Figure 2:
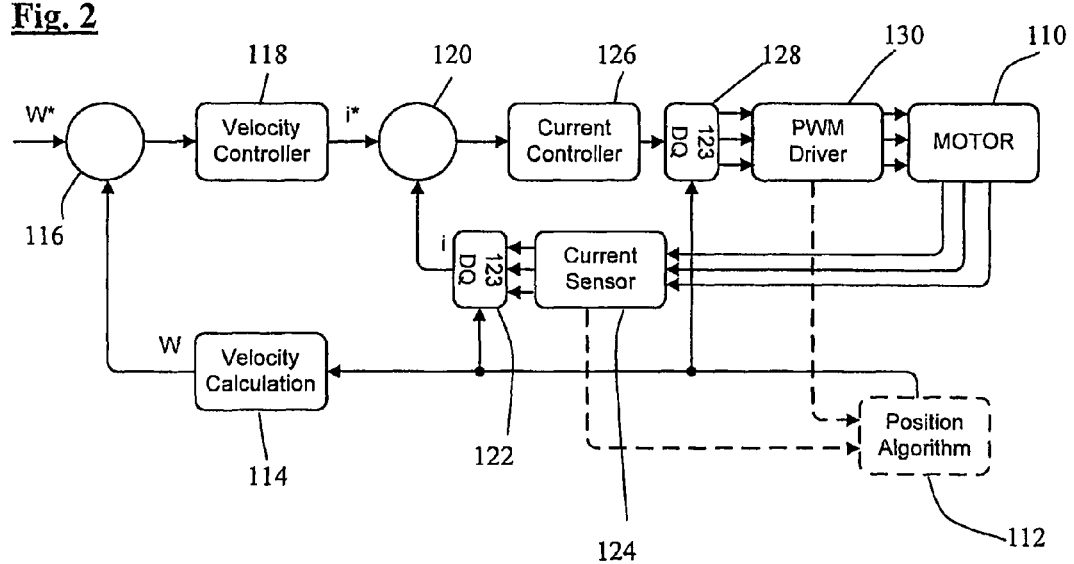
FIG. 2 is a diagram of a motor control system according to an embodiment of the invention.

Referring to FIG. 2 a motor control system according to an embodiment of the invention includes all of the components of the system of FIG. 1, which are indicated by the same reference numerals increased by 100, except the position sensor 12 which is replaced by a sensorless position determining algorithm 112. The position determining algorithm receives the demanded voltages applied to the motor, in this case the demanded phase voltages from the PWM driver 128, and the measured currents in the motor, in this case the phase currents as measured by the current sensor 124. From these the position determining algorithm 112 determines the rotational position of the motor. The basic operation of such a sensorless algorithm is well known.

As previously stated when the motor stalls, for example if the rotor is locked, the sensorless algorithm, because of the negligible back EMF, is unable to operate correctly to determine the rotor position. Therefore the operating parameters of the sensorless algorithm will be different from normal operation. For example the measured motor position will vary in an unusual way, the estimated motor speed and acceleration will also vary in unusual ways, and the voltages generated by the control system to control the motor will also vary in unusual ways. It is this change in operation that the stall detection algorithm is arranged to detect. The sensorless algorithm normally operates within a particular range of values of these and other parameters, but when a stall condition occurs, the ranges over which these parameters vary change, allowing detection by the stall detection algorithm.

Figure 3:
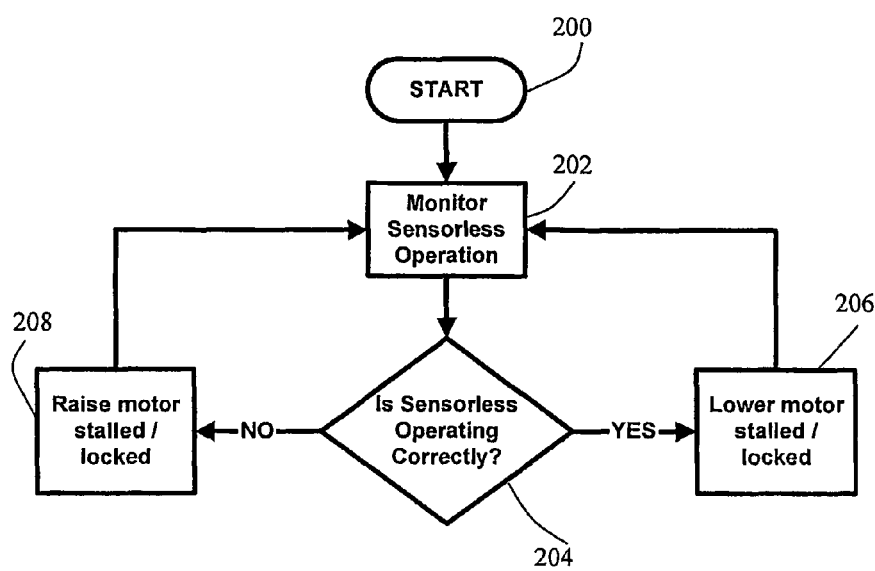
FIG. 3 is a flow chart of a stall detection algorithm used in the system of FIG. 2.

Referring to FIG. 3, in general terms the stall detection algorithm starts at step 200 when the sensorless algorithm 112 starts to operate. It monitors the operation of the sensorless algorithm 112 at step 202 as that algorithm operates during control of the motor 110. At step 204 it determines whether the sensorless algorithm 112 is operating correctly. If it is, then a measure of the stalled condition of the motor 110 is reduced at step 206. If the sensorless algorithm 112 is not operating correctly, then the measure of the stalled condition is increased at step 208. In either case the process returns to step 202 to check the operation of the sensorless algorithm again in a repeating process. It will be appreciated that the measure of the stall condition will increase if stall is detected repeatedly at a high enough frequency and fall if the stall condition is not detected frequently enough. If the measure of the stalled condition reaches a predetermined level, then the algorithm determines that the motor 110 has stalled, and appropriate action is taken, as will be described in more detail below.

To perform step 204 and determine whether the sensorless algorithm is operating correctly a number of measures of performance can be used, and some of these will now be described.

Internally, the sensorless algorithm 112 in this embodiment uses an observer, which includes a model of the motor 110 and is arranged to predict operating parameters of the motor 110 and compare them with measured values. The differences between these, referred to as residuals, are used as part of the overall motor control process, but can also be used for stall detection. This is because when the motor 110 is operating normally, the residuals should be small. Under abnormal operation, where the observer is not operating correctly, the residuals will change and this can be used to detect the stalled motor condition.

Figure 4:
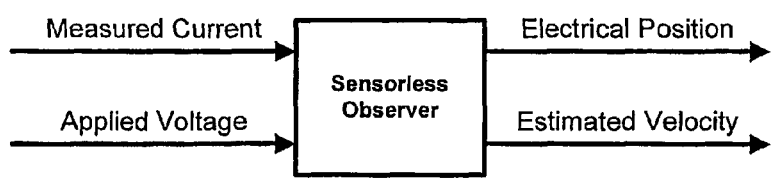
FIG. 4 is a diagram showing inputs and outputs to a sensorless observer forming part of the system of FIG. 2.

Externally the inputs and outputs to the observer are shown in FIG. 4. FIG. 4 shows the velocity calculation internal to the observer where it is derived from the position signal. However the velocity calculation can be performed externally of the observer as shown in FIG. 2. When the observer is not operating correctly due to stalling of the motor 110, the electrical position, and therefore also the estimated velocity, will be incorrect and noisy. These incorrect measurements will in turn affect the voltage applied to the motor 110, for example because using the D/Q to three-phase transformation the voltage applied will be applied at the wrong position. These incorrect applied voltages will result in noisy current measurements, which are then used to drive the observer. With a noisy velocity signal the estimated acceleration, which is the derivative with respect to time of the velocity signal, is generally far greater than the estimated acceleration under normal operating conditions, and indeed generally greater than the actual acceleration of the motor under any conditions. The stall detection algorithm detects these changes in operational state, as the operational parameters of the motor, e.g. current, voltage and estimated acceleration will be outside their normal range of values.

Although the velocity signal may be used to detect stalling it has limitations. A more reliable method of detection is to use the estimated acceleration value. The estimated acceleration value is derived from the velocity measurement, which is in turn derived from the position signal. The jerk of the position estimate, i.e. the derivative of the acceleration with respect to time, can also be used as a parameter which provides useful information.

Figure 5:
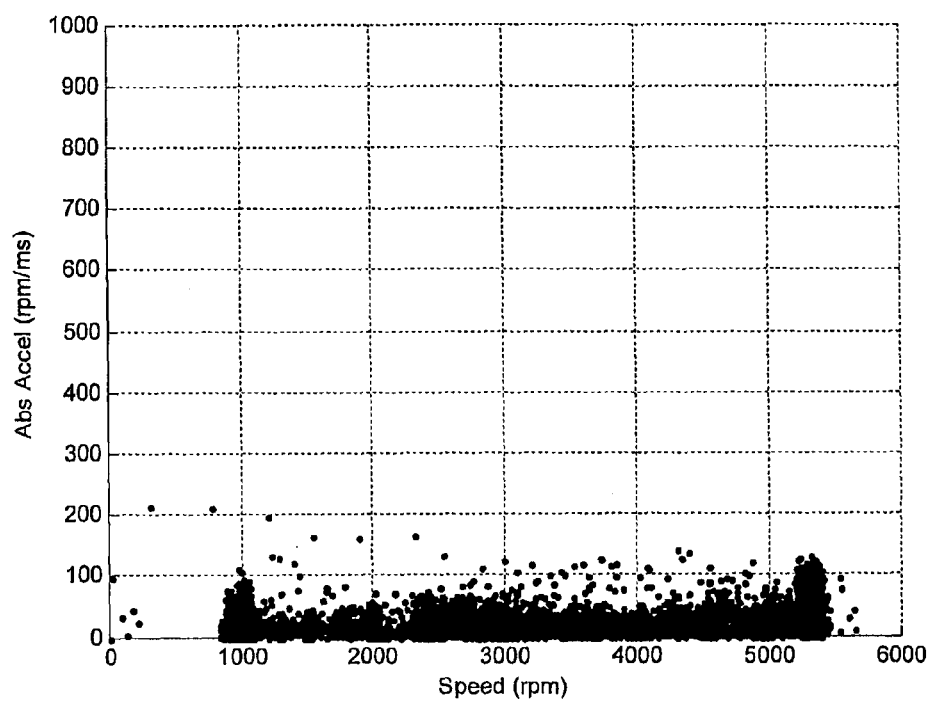
FIG. 5 shows samples of motor speed and acceleration as determined by the sensorless position determining algorithm of the system of FIG. 2, under normal operation.

FIG. 5 shows samples of estimated motor speed and acceleration generated by the sensorless algorithm 112 during normal operation of the motor 110. As can be seen from this figure there is an even distribution of motor speeds over the normal control range of about 1000 to 5500 rpm, and accelerations are generally under about 200 rpm/ms. FIG. 6a shows the same samples on a more compressed vertical scale and FIG. 6b shows the distribution of current for the same sample times. The distribution of current is complex but it will be noted that the maximum current is between 80 A and 90 A.

Figures 7A, 7B:
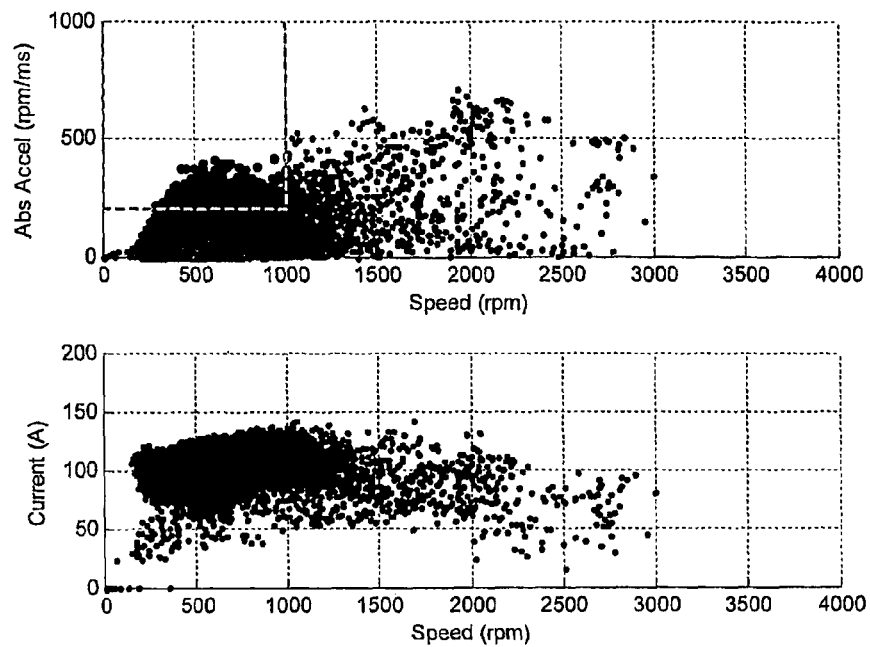
FIGS. 7a and 7b show samples corresponding to those of FIGS. 6a and 6b, but with the motor operating under stall conditions.

FIGS. 7a and 7b show corresponding samples when the motor 110 is experiencing a locked rotor condition. As can be seen, the estimated acceleration, shown on the vertical axis, is much greater when the rotor is locked and the sensorless algorithm 112 is not operating correctly. The velocity is displayed on the horizontal axis and it can be seen that, when the rotor is locked, a velocity is still generated because of the false variation in the position estimation. However, the majority of motor speed values are below 1500 rpm, and a large number are below 1000 rpm, i.e. below the normal operating speed range of the motor. Also a large proportion of the samples have acceleration values of 200 rpm/ms or greater. Also the values for current are much higher than those in FIG. 6b, with a large number of samples having currents above 100 A.

This change in estimated acceleration magnitude can be used as an indication of stalling, and a threshold placed on the acceleration signal. If the absolute acceleration exceeds this specific threshold then the stall detection algorithm detects a stall condition. The estimated acceleration of the motor is defined as the change in motor velocity since the previous calculation divided by the time since the last velocity calculation, i.e.:

Motor Acceleration=(Motor Velocity−Previous Motor Velocity)/TIME SINCE LAST ACCEL CALC
Previous Motor Velocity=Motor Velocity The stall detection diagnostic can then be defined as TRUE if the estimated acceleration exceeds a predetermined value:
IF (absolute(Motor Acceleration)>MOTOR STALL MAX ACCELERATION)
   Stalled Rotor Diagnostic=TRUE
ELSE
   Stalled Rotor Diagnostic=FALSE
ENDIF In the simplest case this could be the complete diagnostic. However, in this embodiment, the TRUE and FALSE values are used in the algorithm of FIG. 3 to raise or lower a measure of the stalled condition, which in practice is a measure of the probability that stall has actually occurred. Stall is only taken to be detected, and responded to, when the measure reaches a predetermined value.

To improve the robustness of the diagnostic and to prevent false triggers, the area of operation within which the diagnostic operates, i.e. the range of parameters over which the algorithm will detect a stall condition, can be reduced by means of a number of enhancements. Although each enhancement is applied cumulatively in this embodiment, they can be applied separately as required.

Although the speed estimate generated by the algorithm is very noisy during stall, it does average to a value close to zero. Therefore if the normal operating range is above a particular speed value the diagnostic can be limited to only operate below this speed limit. FIG. 6 shows the limited velocity range when the motor is stalled compared to the broader speed range of FIG. 5 arising during normal operation. The diagnostic can therefore be extended to detect a stall condition only if the acceleration is above a predetermined limit and the speed is below a predetermined limit. The diagnostic then becomes:
IF ((absolute(Motor Acceleration)>MOTOR STALL MAX ACCELERATION) AND
   (absolute (Motor Velocity<MOTOR STALL MAX VELOCITY))
THEN
   Stalled Rotor Diagnostic=TRUE
ELSE
   Stalled Rotor Diagnostic=FALSE
ENDIF An additional enhancement is to use the current to further reduce the operating range. For a speed controller, where the speed drops below the speed demand such as in a stall condition, the controller will be applying maximum current to attempt to remove the velocity error. FIG. 7b shows this clearly with a large number of samples having demanded currents above 100 A. Limiting the operation of the diagnostic to detect a stall condition only in operating conditions where a high current is being demanded can reduce the operating range and increase robustness. The diagnostic then increases to:
IF ((absolute (Motor Acceleration)>MOTOR STALL MAX ACCELERATION) AND
   (absolute (Motor Velocity)<MOTOR STALL MAX VELOCITY)
AND
   (absolute (Q Axis Current)>MOTOR STALL MIN CURRENT))
THEN
   Stalled Rotor Diagnostic=TRUE
ELSE
   Stalled Rotor Diagnostic=FALSE
ENDIF FIG. 7a shows the operating area, i.e. the ranges of operating parameters, of the stall detection algorithm in which the stalled rotor diagnostic with the enhancements described above are included. The rectangle in the top left hand corner defines the area of operation, with the limiting maximum speed being 1000 rpm and the limiting minimum acceleration being 200 rpm/ms.

Referring back to FIG. 3, to make the diagnostic robust, a threshold can be placed on the number of stall conditions that must be detected before the diagnostic detects a stall and acts upon it. For example, if the number of faults seen within a predetermined time period, e.g., second, exceeds a threshold, then a stall is deemed to be detected. If less than the minimum number of faults is detected within a given period, they are ignored. This allows occasional glitches to be ignored and not accumulated.

Figure 8:
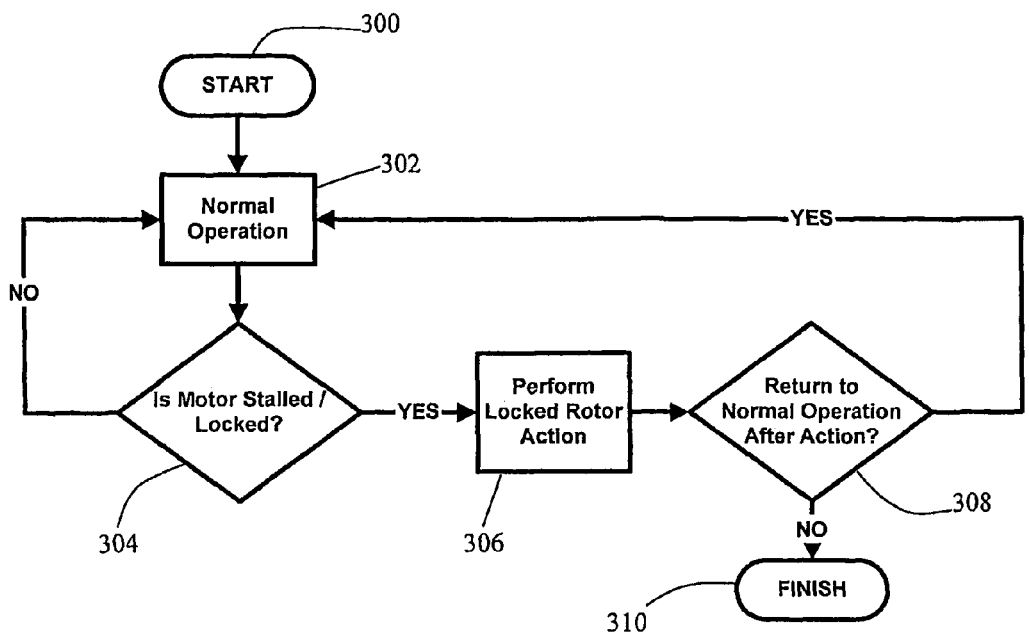
FIG. 8 is a flow diagram showing how the system of FIG. 2 responds to detection of a stall condition.

Once a locked or otherwise stalled motor has been detected there are a number of possible actions that the system can take in response, some of which attempt to overcome the stall condition, and some of which do not. Referring to FIG. 8, the process for responding to detection of a stall condition starts at step 300 when the sensorless algorithm 112 starts, and progresses to step 302 where the algorithm operates normally. The process then proceeds to step 304 where it checks for stall of the motor 110 using the process of FIG. 3. Provided stall is not detected, the process cycles back to step 302. However, if stall is detected, then the process proceeds to stop 306 where a stalled, or locked, rotor action is performed. Once the action has been performed, the process checks at step 308 whether the sensorless algorithm has returned to normal operation. If it has, then the process returns to step 302, but if not the process finishes at step 310, in which case, for example, the irrecoverable stall condition may be reported.

The stalled, or locked, rotor action can include any one or more of the following steps.

Figure 9:
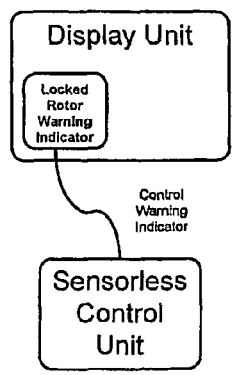
FIG. 9 shows a response of the system of FIG. 2 to detection of a stall condition.

A warning may be raised for external action. For example, referring to FIG. 9, in an electrically powered hydraulic vehicle steering system, where the motor is used to drive a pump to provide hydraulic steering assistance, the sensorless stall detection algorithm may generate an output warning signal, which is arranged to produce a warning on a display unit in the vehicle in the event of stall of the motor 110.

Figure 10:
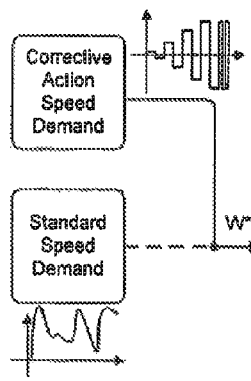
FIG. 10 shows the generation of a corrective action speed demand in response to detection of a stall condition in the system of FIG. 2.
Figure 11:
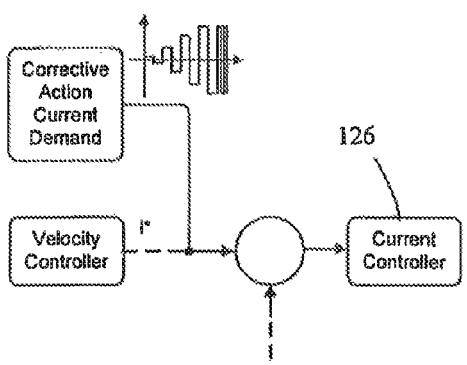
FIG. 11 shows the generation of a corrective current demand in response to detection of a stall condition in the system of FIG. 2.

The motor control system may respond to stall detection by entering a predefined routine in an attempt to remove the stall condition. For example for a pump application the motor may be caused to change direction, to run, and hence drive the pump, in the opposite direction to normal or the opposite direction to that in which it was previously running, in an attempt to remove any potential debris. Other controlled variations in the operation of the motor could also be implemented to try to remove the debris. Referring to FIG. 10, this type of corrective action can be implemented by means of a corrective action speed demand which is input to the control system in place of the normal speed demand. The corrective action speed demand may be of a fixed nature, or could depend on, for example, recent operating parameters of the motor. Alternatively, as shown in FIG. 11, the corrective action can be implemented by means of a corrective action current demand, which is input to the current controller in place of the current demand from the velocity. Again this can be a fixed response or dependent on some parameters. As a further option it can be applied as a direct voltage to the motor but this is not preferred as there is limited control over the current that can be generated.

Figure 12:
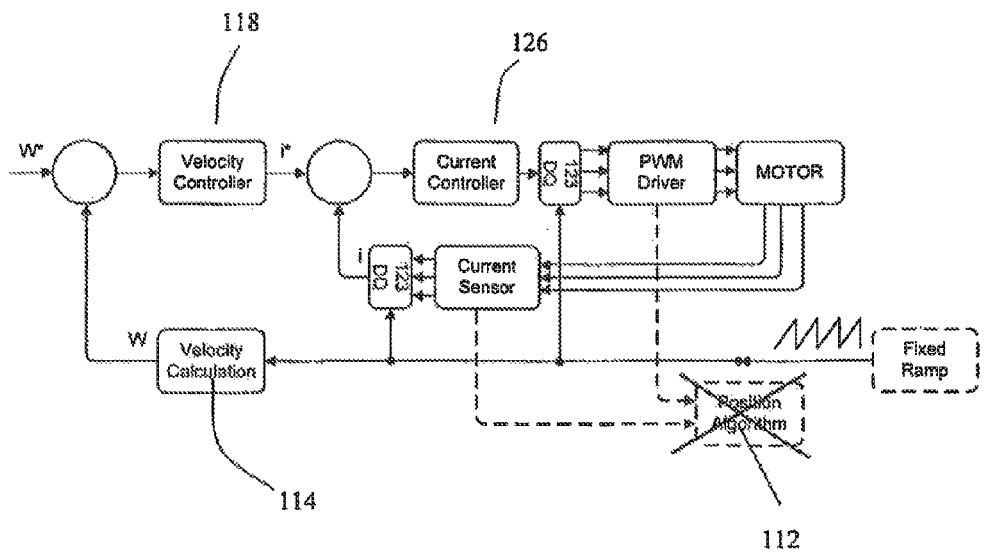
FIG. 12 shows generation of a ramped position signal in response to detection of a stall condition in the system of FIG. 2.

Referring to FIG. 12, a further stalled rotor action which can be implemented is to apply a fixed ramped position signal in place of the position signal output by the sensorless algorithm. Such a ramped position signal, corresponding to rotation of the rotor at a constant velocity, can be used to rotate the voltage vector at a fixed frequency in an attempt to remove the stalled motor condition.

As a further possibility, on detection of stall, the motor control may be disabled, i.e. power to the motor may be cut off. Alternatively the system may do nothing and continue to control the motor.

The actions may be applied indefinitely, for a fixed period of time or until the stalled rotor diagnostic shows that normal operation has been resumed.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A control system for an electric motor arranged to have electrical voltages applied to the motor to generate electrical currents in the motor, the control system comprising:
   a controller that is adapted to generate electrical currents in an electric motor; and
   a processor that controls the controller by performing a sensorless position determining algorithm which includes:
   (1) monitoring the electrical voltages applied to the motor and the electrical currents generated in the motor,
   (2) determining from the electrical voltages and electrical currents a rotational position of the motor,
   (3) monitoring at least one estimated operating parameter of the motor generated within the sensorless position determining algorithm, and
   (4) using the at least one estimated operating parameter of the motor monitored by the sensorless position determining algorithm to detect a stall condition of the motor.

2. The control system according to claim 1 wherein the at least one estimated operating parameter includes an estimated acceleration of the motor.

3. The control system according to claim 2 arranged to define a predetermined value of the estimated acceleration and to detect the stall condition if the estimated acceleration is above the predetermined value of the estimated acceleration.

4. The control system according to claim 3 arranged to monitor repeatedly for detection of the stall condition, and to determine that a stall has occurred only if the stall condition occurs a predetermined number of times within a predetermined period of time.

5. The control system according to claim 3 wherein the estimated operating parameter also includes an estimated speed of the motor and the control system is arranged to define a predetermined value of the estimated speed and further wherein the stall condition is detected if the estimated acceleration is above the predetermined value of the estimated acceleration and the estimated speed is below the predetermined value of the estimated speed.

6. The control system according to claim 5 arranged to monitor repeatedly for detection of the stall condition, and to determine that a stall has occurred only if the stall condition occurs a predetermined number of times within a predetermined period of time.

7. The control system according to claim 5 wherein the estimated operating parameter also includes an estimated demand current for the motor and the operating system is also arranged to define a predetermined value of the estimated demanded current and further wherein a stall condition is detected if all of the following conditions are met:
   (a) the estimated acceleration is above the predetermined value of the estimated acceleration;
   (b) the estimated speed is below the predetermined value of the estimated speed; and
   (c) the estimated demanded current exceeds the predetermined value of the estimated demanded current.

8. The control system according to claim 7 arranged to monitor repeatedly for detection of the stall condition, and to determine that a stall has occurred only if the stall condition occurs a predetermined number of times within a predetermined period of time.

9. The control system according to claim 1 wherein the at least one estimated operating parameter includes an estimated speed of the motor.

10. The control system according to claim 9 arranged to define a predetermined value of the estimated speed and to detect the stall condition if the estimated speed is below the predetermined value of the estimated speed.

11. The control system according to claim 10 arranged to monitor repeatedly for detection of the stall condition, and to determine that a stall has occurred only if the stall condition occurs a predetermined number of times within a predetermined period of time.

12. The control system according to claim 1 arranged to monitor repeatedly for detection of the stall condition, and to determine that a stall has occurred only if the stall condition occurs a predetermined number of times within a predetermined period of time.

13. The control system according to claim 1 arranged to perform a stall response action in response to detection of the stall condition.

14. The control system according to claim 13 wherein the stall response action includes providing a warning.

15. The control system according to claim 13 wherein the stall response action includes generating a control input.

16. The control system according to claim 15 wherein the control input is a current demand.

17. The control system according to claim 15 wherein the control input is a speed demand.

18. The control system according to claim 15 wherein the control input is a position signal.

19. The control system according to claim 1 wherein the at least one estimated operating parameter of the motor includes an estimated velocity of the motor.

20. A combined electric motor and control system comprising:
- an electric motor arranged to have electrical voltages applied thereto so as to generate electrical currents in the motor; and
- a control system including a controller that generates electrical currents in the electric motor and a processor that controls the controller by performing a sensorless position determining algorithm which:
  (1) monitors the electrical voltages applied to the motor and the electrical currents generated in the motor,
  (2) determines from the electrical voltages and electrical currents a rotational position of the motor,
  (3) monitors at least one estimated operating parameter of the motor generated within the sensorless position determining algorithm, and
  (4) uses the at least one estimated operating parameter of the motor monitored by the sensorless position determining algorithm to detect a stall condition of the motor.

* * * * *